United States Patent
Van Phan et al.

(10) Patent No.: US 11,700,652 B2
(45) Date of Patent: Jul. 11, 2023

(54) PROXIMITY SERVICES DEVICE-TO-DEVICE COMMUNICATION SERVICES CONTROL

(71) Applicant: Nokia Solutions and Networks Oy, Espoo (FI)

(72) Inventors: Vinh Van Phan, Oulu (FI); Ling Yu, Kauniainen (FI); Kari Veikko Horneman, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/533,480

(22) PCT Filed: Dec. 19, 2014

(86) PCT No.: PCT/EP2014/078803
§ 371 (c)(1),
(2) Date: Jun. 6, 2017

(87) PCT Pub. No.: WO2016/096047
PCT Pub. Date: Jun. 23, 2016

(65) Prior Publication Data
US 2017/0339730 A1    Nov. 23, 2017

(51) Int. Cl.
*H04W 76/14* (2018.01)
*H04W 4/80* (2018.01)
(Continued)

(52) U.S. Cl.
CPC .............. *H04W 76/14* (2018.02); *H04W 4/80* (2018.02); *H04W 8/005* (2013.01); *H04W 72/23* (2023.01)

(58) Field of Classification Search
CPC ........... H04W 76/023; H04W 72/0413; H04W 72/0446
See application file for complete search history.

(56) References Cited

U.S. PATENT DOCUMENTS 10,219,216 B2 * 2/2019 Sorrentino ........ H04W 72/1289
10,477,460 B2 * 11/2019 Kim ...................... H04W 76/14
(Continued)

FOREIGN PATENT DOCUMENTS

WO    WO-2015003153 A1 *  1/2015  ............ H04W 72/10
WO    WO-2015169004 A1 * 11/2015  ............ H04W 76/14

OTHER PUBLICATIONS

International Search Report and Written Opinion received for corresponding Patent Cooperation Treaty Application No. PCT/EP2014/078803, dated Oct. 20, 2015, 9 pages.
(Continued)

*Primary Examiner* — Khaled M Kassim
*Assistant Examiner* — Berhanu D Belete
(74) *Attorney, Agent, or Firm* — Squire Patton Boggs (US) LLP

(57) ABSTRACT

The present invention addresses method, apparatus and computer program product for setting up a proximity services device-to-device communication service. Thereby, by a transmitting user equipment, a message including application control information is compiled, a scheduling assignment for scheduling the message transmission is transmitted to a device to be set up, and the message is transmitted to the device according to the scheduling assignment. A receiving user equipment receives a scheduling assignment and at least one of data packets scheduled in the scheduling assignment, determines whether at least one of the received data packets relates to a new proximity services device-to-device communication service traffic flow, determines whether a message including application control information is included in the at least one of the received data packets, and completes the setup based on the application control information.

20 Claims, 5 Drawing Sheets

(51) Int. Cl.
  *H04W 72/23*     (2023.01)
  *H04W 8/00*      (2009.01)

(56) References Cited

U.S. PATENT DOCUMENTS

| | | | |
|---|---|---|---|
| 2012/0093098 A1* | 4/2012 | Charbit | H04W 52/383 370/329 |
| 2013/0287012 A1* | 10/2013 | Pragada | H04W 76/22 370/338 |
| 2013/0288668 A1 | 10/2013 | Pragada et al. | |
| 2013/0294283 A1* | 11/2013 | Van Phan | H04L 69/32 370/252 |
| 2013/0303088 A1* | 11/2013 | Watfa | H04W 4/80 455/41.2 |
| 2013/0315079 A1* | 11/2013 | Edge | H04L 65/1016 370/252 |
| 2013/0322413 A1* | 12/2013 | Pelletier | H04W 76/14 370/336 |
| 2014/0056220 A1* | 2/2014 | Poitau | H04W 76/14 370/328 |
| 2014/0057566 A1* | 2/2014 | Watfa | H04W 48/16 455/41.2 |
| 2014/0211705 A1* | 7/2014 | Baek | H04W 76/14 370/329 |
| 2014/0211767 A1* | 7/2014 | Lunttila | H04W 52/22 370/336 |
| 2014/0295868 A1* | 10/2014 | Lee | H04W 76/27 455/552.1 |
| 2014/0301307 A1 | 10/2014 | Lee et al. | |
| 2014/0341112 A1* | 11/2014 | Agiwal | H04L 67/14 370/328 |
| 2015/0004901 A1* | 1/2015 | Agiwal | H04W 76/11 455/39 |
| 2015/0004984 A1* | 1/2015 | Kim | H04W 76/23 455/440 |
| 2015/0029936 A1* | 1/2015 | Johnsson | H04B 17/318 370/328 |
| 2015/0043429 A1* | 2/2015 | Kim | H04L 67/52 370/328 |
| 2015/0078301 A1* | 3/2015 | Toth | H04W 76/40 370/329 |
| 2015/0215903 A1* | 7/2015 | Zhao | H04W 72/082 370/329 |
| 2015/0271675 A1* | 9/2015 | Cheng | H04W 12/122 455/410 |
| 2015/0271846 A1* | 9/2015 | Kowalski | H04W 72/23 370/329 |
| 2015/0282236 A1* | 10/2015 | Chai | H04W 76/14 370/329 |
| 2015/0289253 A1* | 10/2015 | Pan | H04W 72/0413 370/329 |
| 2015/0305070 A1* | 10/2015 | Ahmad | H04W 76/10 370/338 |
| 2015/0334760 A1* | 11/2015 | Sartori | H04L 12/6418 370/329 |
| 2015/0382159 A1* | 12/2015 | Kim | H04W 4/80 370/312 |
| 2016/0044729 A1* | 2/2016 | Tu | H04W 72/52 370/329 |
| 2016/0044740 A1* | 2/2016 | Siomina | H04W 76/14 455/552.1 |
| 2016/0048878 A1* | 2/2016 | Corbalis | H04W 4/029 705/14.58 |
| 2016/0050558 A1* | 2/2016 | Wallentin | H04W 8/005 370/329 |
| 2016/0050559 A1* | 2/2016 | Rose | H04W 12/02 370/338 |
| 2016/0066357 A1* | 3/2016 | Goldhamer | H04W 4/80 701/1 |
| 2016/0080969 A1* | 3/2016 | Tseng | H04W 4/70 370/329 |
| 2016/0088668 A1* | 3/2016 | Kim | H04W 4/70 370/315 |
| 2016/0128116 A1* | 5/2016 | Kim | H04W 4/021 370/329 |
| 2016/0135217 A1* | 5/2016 | Lee | H04L 47/30 370/329 |
| 2016/0142898 A1* | 5/2016 | Poitau | H04W 72/0446 370/329 |
| 2016/0150373 A1* | 5/2016 | Kim | H04W 8/005 455/456.3 |
| 2016/0219640 A1* | 7/2016 | Jung | H04W 76/14 |
| 2016/0278009 A1* | 9/2016 | Sorrentino | H04W 72/02 |
| 2016/0278115 A1* | 9/2016 | Shrader | H04W 24/10 |
| 2016/0374104 A1* | 12/2016 | Watfa | H04W 76/23 |
| 2016/0374110 A1* | 12/2016 | Lee | H04W 12/06 |
| 2017/0019812 A1* | 1/2017 | Lee | H04W 76/14 |
| 2017/0019833 A1* | 1/2017 | Luo | H04W 40/02 |
| 2017/0064733 A1* | 3/2017 | Lee | H04W 72/1278 |
| 2017/0078898 A1* | 3/2017 | Huang | H04W 24/02 |
| 2017/0142741 A1* | 5/2017 | Kaur | H04W 72/12 |
| 2017/0171725 A1* | 6/2017 | Toth | H04L 69/22 |
| 2017/0188221 A1* | 6/2017 | Lee | H04W 8/005 |
| 2017/0202038 A1* | 7/2017 | Ahmad | H04W 12/0431 |
| 2017/0215160 A1* | 7/2017 | Löhr | H04L 5/0094 |
| 2017/0280423 A1* | 9/2017 | Zhao | H04W 56/002 |
| 2017/0303240 A1* | 10/2017 | Basu Mallick | H04W 72/02 |
| 2018/0020327 A1* | 1/2018 | Enomoto | H04W 4/023 |
| 2018/0171725 A1* | 6/2018 | Cook | E21B 17/04 |
| 2018/0332644 A1* | 11/2018 | Jeong | H04W 76/14 |

OTHER PUBLICATIONS

European Office Action issued in corresponding European Patent Application No. 14 824 465.0-1231 dated Mar. 25, 2020.
European Office Action issued in corresponding European Patent Application No. 14 824 465.0-1231 dated Oct. 15, 2020.
European Office Action issued in corresponding European Patent Application No. 14 824 465.0 dated Apr. 20, 2021.
Vietnamese Office Action issued in corresponding Vietnamese Patent Application No. 1-2017-02696 dated Jun. 22, 2022.

* cited by examiner

PROXIMITY SERVICES DEVICE-TO-DEVICE COMMUNICATION SERVICES CONTROL

RELATED APPLICATION

This application was originally filed as Patent Cooperation Treaty Application No. PCT/EP2014/078803 filed Dec. 19, 2014.

FIELD OF THE INVENTION

The present invention generally relates to wired and wireless communication networks, and more specifically relates to a method, apparatus and computer program product for improved establishing of Proximity services device-to-device communication services.

BACKGROUND

Mobile data transmission and data services are constantly making progress, wherein such services provide various communication services, such as voice, video, packet data, messaging, broadcast, etc. In recent years, Long Term Evolution LTE™ has been specified, which uses the Evolved Universal Terrestrial Radio Access Network E-UTRAN as radio communication architecture according to 3GPP specification.

Further, device-to-device D2D communications has been proposed as a part of the LTE-Advanced LTE-A framework, whose aim is to improve user experiences and resource utilization while taking advantage of the proximity of users to each other. Thereby, proximity services ProSe have been introduced, which may be regarded as evolution of location based services.

According to current specifications as defined e.g. in 3GPP Release 12, ProSe D2D communications targeted for only public safety PS applications and services are based on one-to-many 1:M broadcast based D2D communications, in which an authorized and capable user equipment UE may be able to receive D2D communications from a transmitting UE in its proximity without a need of D2D discovery and connection establishment with the transmitting UE beforehand.

That is, as long as the receiving UE is provided with valid resource pools to monitor and receive D2D scheduling assignments SA sent by a transmitting UE, the receiving UE is able to receive D2D communications transmitted by that transmitting UE. There is no control plane over D2 link air interface for D2D data traffic transmission and reception.

The current assumption is that a new receiving layer-2 L2 entity is set up at the receiving UE upon reception of the first "new" packet targeted to the receiving UE or its belonging user group. The first "new" packet identifies either a new L2 source identifier ID, a new L2 target ID or a new L2 logical channel ID to the receiving UE.

However, from end-to-end E2E application and service perspectives focusing on possible service start and service continuity at the receiving UE in the aforementioned broadcast based D2D communications, the main question is that how the receiving UE may determine that the aforementioned first "new" packet is also the first "meaningful" packet for the application in an efficient fashion.

Here, the first "meaningful" packet refers to the packet which can be used to start the service and continue to receive the service also in application layer. That is, the first "meaningful" packet should contain or associate with all the necessary information that enables the application layer to activate the right application with right configuration and setting in order to receive and conduct the D2D communications of interest, either for a voice or video call or a multimedia messaging service.

In one scenario, if it is left all for the application layer to determine the first "meaningful" packet and start receiving the service from there, either the lower layers may have to receive all the "un-meaningful" packets prior to that first "meaningful" one, or each application packet may have to carry all the necessary application control information resulting in increasing overhead and wasting energy and radio resources.

Further, in regular communications services, service setup phase is often required, and the activation of application in question is done in advance at both transmitting and receiving ends. Hence, in the prior art related to D2D, direct over-the-air discovery and connection establishment between devices are assumed as well.

SUMMARY OF THE INVENTION

Therefore, in order to overcome the drawbacks of the prior art, it is an object underlying the present invention to provide an efficient method to signal necessary application control information in 1:M broadcast based D2D communications without a need of D2D discovery and connection setup so that an authorized UE may start receiving the service of interest as soon as possible without wasting energy to receive "un-meaningful" data.

In particular, it is an object of the present invention to provide a method, apparatus and computer program product for improved establishing of ProSe D2D communication services.

According to a first aspect of the present invention, there is provided a method for setting up a proximity services device-to-device communication service, comprising compiling a message including application control information, transmitting a scheduling assignment for scheduling the message transmission to a device to be set up, and transmitting the message to the device according to the scheduling assignment.

According to a second aspect of the present invention, there is provided an apparatus for setting up a proximity services device-to-device communication service, comprising at least one processor, and at least one memory for storing instructions to be executed by the processor, wherein the at least one memory and the instructions are configured to, with the at least one processor, cause the apparatus at least to perform compiling a message including application control information, transmitting a scheduling assignment for scheduling the message transmission to a device to be set up, and transmitting the message to the device according to the scheduling assignment.

According to a third aspect of the present invention, there is provided a method for setting up a proximity services device-to-device communication service, comprising receiving, from a device requesting setup, a scheduling assignment and at least one of data packets scheduled in the scheduling assignment, determining whether at least one of the received data packets relates to a new proximity services device-to-device communication service traffic flow, determining whether a message including application control information is included in the at least one of the received data packets, and completing the setup based on the application control information.

According to a fourth aspect of the present invention, there is provided an apparatus for setting up a proximity services device-to-device communication service, comprising at least one processor, and at least one memory for storing instructions to be executed by the processor, wherein the at least one memory and the instructions are configured to, with the at least one processor, cause the apparatus at least to perform receiving, from a device requesting setup, a scheduling assignment and at least one of data packets scheduled in the scheduling assignment, determining whether at least one of the received data packets relates to a new proximity services device-to-device communication service traffic flow, determining whether a message including application control information is included in the at least one of the received data packets, and completing the setup based on the application control information.

According to a fifth aspect of the present invention, there is provided a computer program product comprising computer-executable components which, when the program is run, are configured to carry out the method according to the first or third aspect.

Advantageous further developments or modifications of the aforementioned exemplary aspects of the present invention are set out in the dependent claims.

According to certain embodiments of the present invention, the at least one of data packets is at least one of a user data packet and layer-2 control packet that is scheduled and transmitted with the scheduling assignment.

According to certain embodiments of the present invention, the message including the application control information is signalled in the access stratum.

According to certain embodiments of the present invention, the application control information comprises information needed at the device to be set up for receiving service contents relating to the proximity services device-to-device communication service. Thereby, the information may comprise information for enabling the application layer to activate an application related to the proximity services device-to-device communication service with the configuration assigned thereto.

According to certain embodiments of the present invention, the application control information comprises at least one of application ID and service ID and related profile setting, and configuration information and ongoing session ID and related information.

According to certain embodiments of the present invention the application ID or service ID and related profile setting or configuration information comprises at least one of source coding scheme, logical data flow, priority, and required bandwidth.

According to certain embodiments of the present invention the ongoing session ID and related information comprises at least one of starting time, source and destination users or user groups, priority of the source, and service portal information.

Further, according to certain embodiments of the present invention, the message including the application control information is transmitted and retransmitted once per current scheduling assignment period as allocated, or as configured by an upper layer above the access stratum.

Further, according to certain embodiments of the present invention, the message including the application control information is transmitted separated to data information referring to actual user data, and transmission of the message including the application control information is handled using logical channel prioritization. Thereby, different protocol data unit types for the application control information and the actual user data may be provided at either packet data convergence protocol or medium access control.

Further, according to certain embodiments of the present invention, a packet data convergence protocol C-layer protocol data unit or a medium access control control element or medium access control C-layer protocol data unit is introduced over device-to-device link to provide the application control information, which is provided by an upper layer above the access stratum and stored at layer-2.

According to certain embodiments of the present invention, the scheduling assignment comprises a 1-bit indication, indicating whether the upcoming transmissions scheduled in the allocation granted in the current scheduling assignment contain application control information or not.

Further, according to certain embodiments of the present invention, it is determined, upon receiving layer-2 packets of a new service flow, whether a first packet carrying relevant application control information of the new service flow is received, and discarding all the layer-2 packets of the new service flow prior to receiving the first packet.

BRIEF DESCRIPTION OF DRAWINGS

For a more complete understanding of example embodiments of the present invention, reference is now made to the following descriptions taken in connection with the accompanying drawings in which.

DESCRIPTION OF EXEMPLARY EMBODIMENTS

Figure 1A:
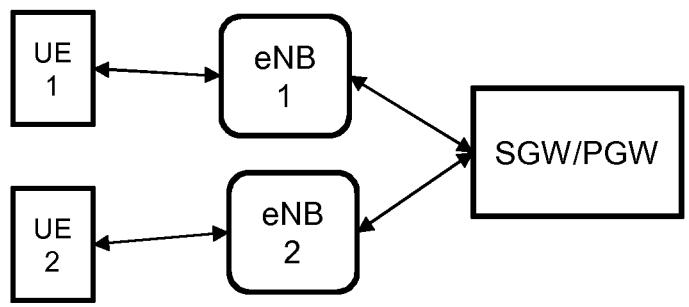
FIG. 1a illustrates a default data path scenario for communication between two UEs according to 3GPP TR 22.803.

Exemplary aspects of the present invention will be described herein below. More specifically, exemplary aspects of the present invention are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Some example versions of the disclosure and embodiments are described with reference to the drawings. In the following, different exemplifying examples will be described using, as an example of a communication network, a cellular wireless communication network, such as an LTE or LTE-Advanced based system. However, it is to be noted that the present invention is not limited to an application using such types of communication system, but is also applicable in other types of communication systems, be it wireless systems, wired systems or systems using a combination thereof.

Hereinafter, various embodiments and implementations of the present invention and its aspects or embodiments are described using several alternatives. It is generally noted that, according to certain needs and constraints, all of the described alternatives may be provided alone or in any conceivable combination, also including combinations of individual features of the various alternatives.

In particular, the following examples versions and embodiments are to be understood only as illustrative examples. Although the specification may refer to "an", "one", or "some" example version(s) or embodiment(s) in several locations, this does not necessarily mean that each such reference is to the same example version(s) or embodiment(s), or that the feature only applies to a single example version or embodiment. Single features of different embodiments may also be combined to provide other embodiments. Furthermore, words "comprising" and "including" should be understood as not limiting the described embodiments to consist of only those features that have been mentioned and such example versions and embodiments may also contain also features, structures, units, modules etc. that have not been specifically mentioned.

In general, a telecommunication network comprises plural network elements, such as evolved NodeB's (eNB; i.e. base station in LTE environment), user equipments UE (e.g. mobile phone, smart phone, Computer, etc.), controllers, interfaces, etc, and in particular any equipment used in the provision of a telecommunications service.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a base station and a communication network besides those described in detail herein below.

Basically, the present invention is related to LTE-A Proximity Services ProSe and D2D communications in line with the specifications 3GPP Release 12/13 and beyond, but is not limited thereto. Rather, the present invention may be applied to any appropriate communication architecture which is conceivable by one skilled in the art.

In general, proximity services ProSe Communication is a communication between two UEs in proximity by means of e.g. a E-UTRAN communication path established between the UEs. The communication path could for example be established directly between the UEs or routed via local eNB(s). Thereby, proximity is determined when given proximity criteria are fulfilled. Proximity criteria can be different for discovery and communication.

Figure 1B:
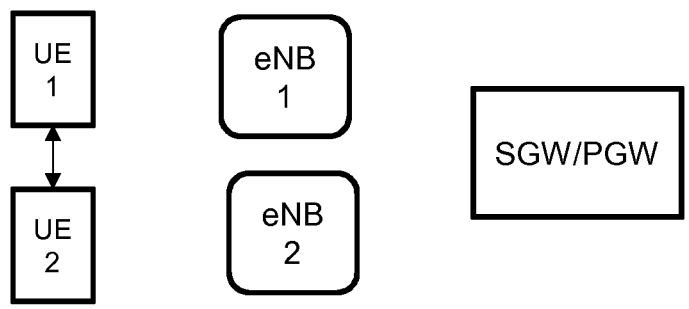
FIG. 1b illustrates a "direct mode" data path for communication between two UEs according to 3GPP TR 22.803.
Figure 1C:
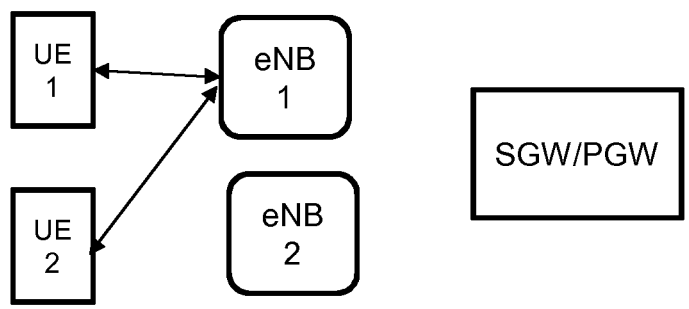
FIG. 1c illustrates a "locally-routed" data path for communication between two UEs when UEs are served by the same eNBs according to 3GPP TR 22.803.

FIGS. 1*a* to 1*c* illustrate general exemplary evolved packet systems EPS for communication between two user equipments UEs according to 3GPP TR 22.803. Thereby, FIG. 1*a* shows a default data path scenario in the EPS for communication between two UEs, wherein two UEs in close proximity communicate with each other using a data path (user plane) via the operator network. FIG. 1*b* shows a "direct mode" data path in the EPS for communication between two UEs, wherein the UEs perform a direct communication without operator network. FIG. 1*c* illustrates a "locally-routed" data path in the EPS for communication between two UEs, when UEs are served by the same eNBs.

According to certain embodiments of the invention, it is proposed an efficient method for access stratum AS to assist in signaling necessary application control information ACI in 1:M broadcast based D2D communications without a need of D2D discovery and connection setup, so that an authorized UE may start receiving the service of interest without wasting energy to receive "un-meaningful" data.

According to certain exemplary versions of the invention, necessary ACI contains, for examples, application or service ID and related profile setting or configuration (such as source coding scheme, logical data flow, priority, required bandwidth, etc.); ongoing session ID and related information (such as starting time, source and destination users or user groups, priority of the source, service portal information, etc.) which are needed for the receiving UE to receive the service contents.

The ACI is transmitted and retransmitted by the transmitting UE in a regular basis, for example once per current scheduling assignment SA period as allocated, such as e.g. in first packet transmitted within the allocation granted in the current SA, or, if once per certain preconfigured interval (e.g. 100 ms) cannot be ensured, as configured by an upper layer above the AS.

Figure 2:
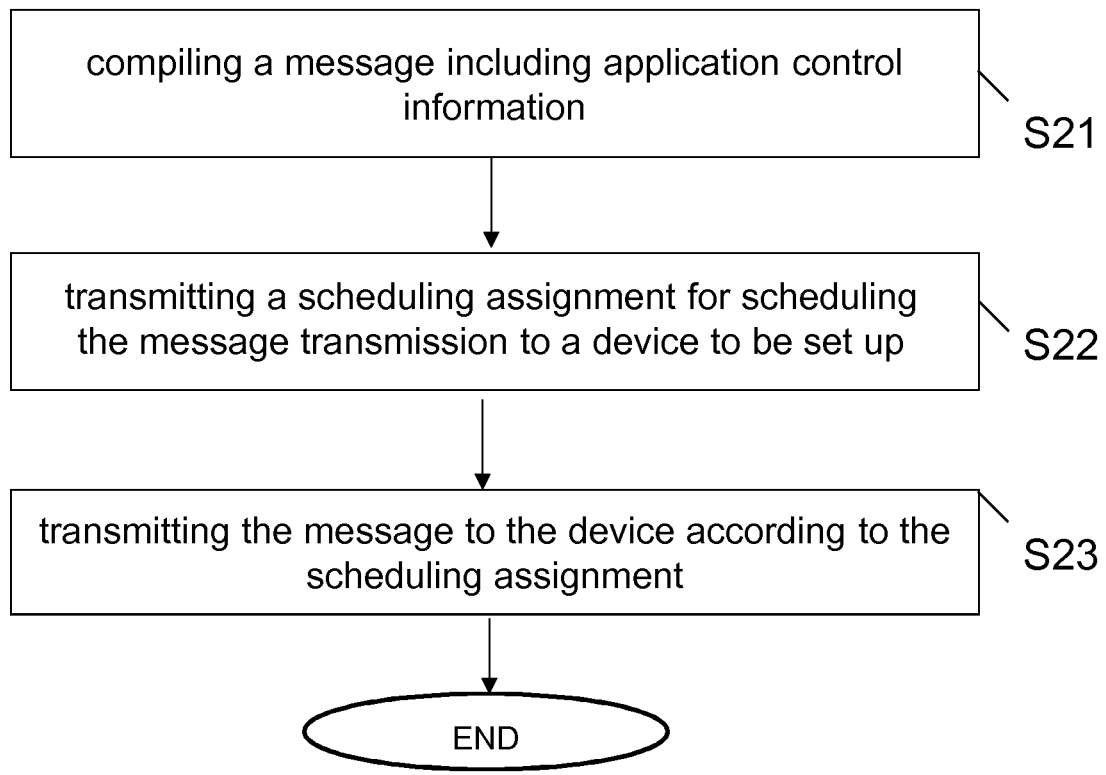
FIG. 2 illustrates a method according to certain embodiments of the invention, which may be carried out by a transmitting user equipment.

FIG. 2 shows a method for setting up a ProSe D2D communication service according to some example versions of the disclosure, which may be performed by a user equipment e.g. under LTE-A environment.

In Step S21, a message including application control information is compiled.

Then, in Step S22, a scheduling assignment for scheduling the message transmission is transmitted to a device to be set up.

Further, in Step S23, the message is transmitted to the device according to the scheduling assignment.

Figure 3:
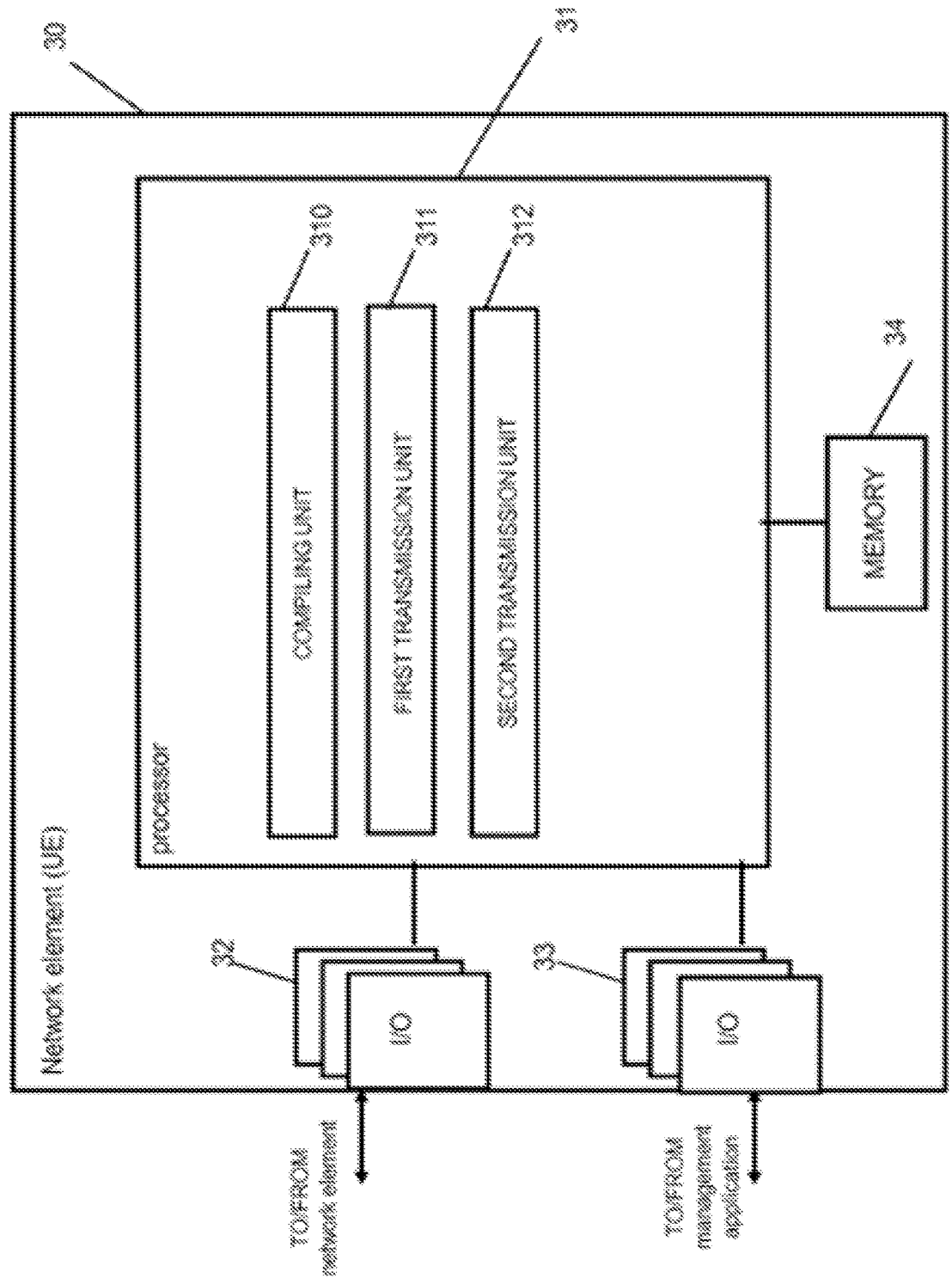
FIG. 3 depicts a general structure of an apparatus according to certain embodiments of the invention, which may be comprised in a transmitting user equipment.
Figure 5:
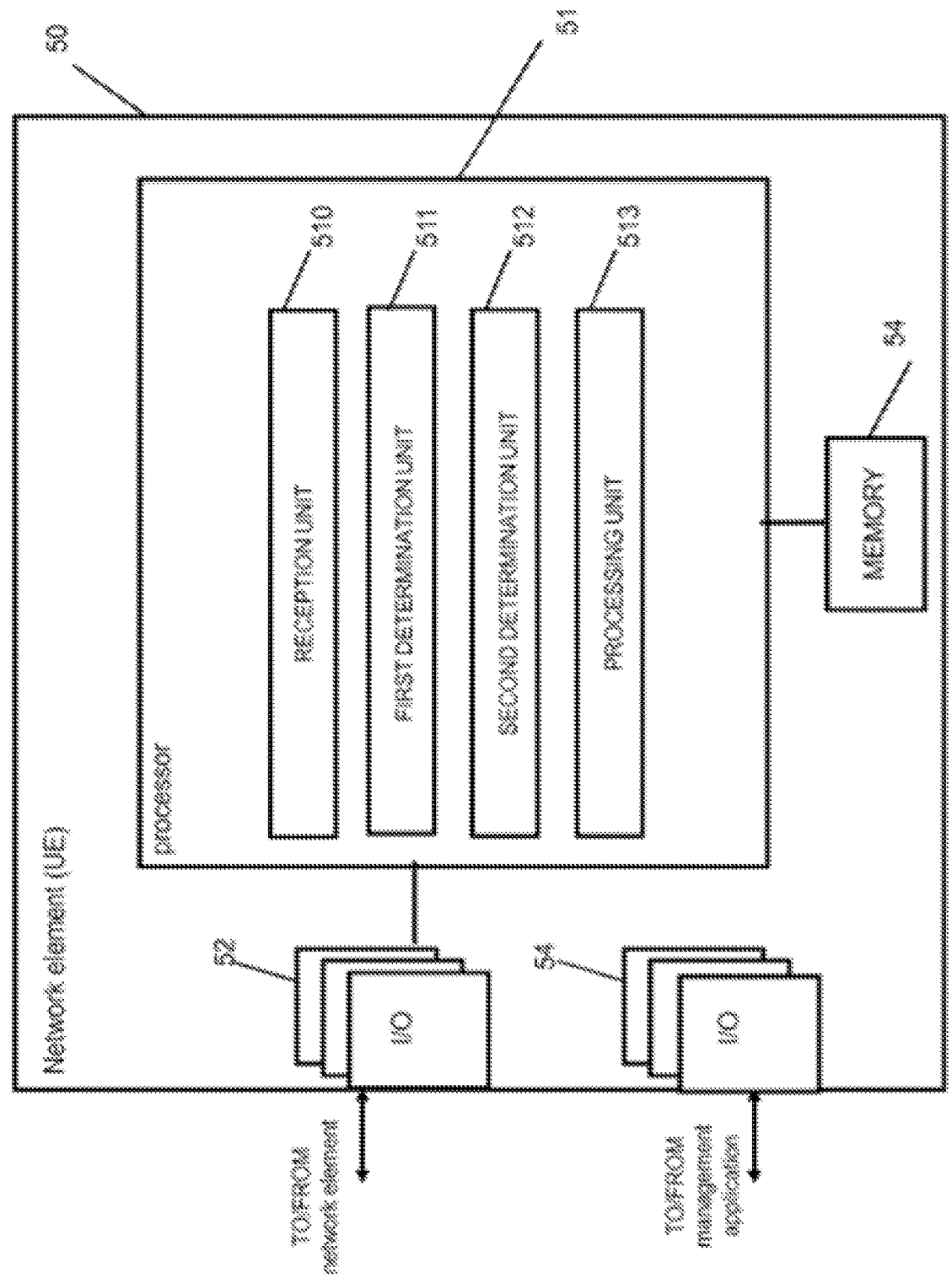
FIG. 5 depicts a general structure of an apparatus according to certain embodiments of the invention, which may be comprised in a receiving user equipment.

In FIGS. 3 and 5, diagrams illustrating a configuration of an element comprised in a network element, such as a user equipment operable in LTE-A, according to some example versions of the disclosure is shown, which is configured to implement setting up a ProSe D2D communication service described in connection with some of the example versions of the disclosure. The embodiments may be carried out in or by the network element (e.g. UE). It is to be noted that the network element may comprise elements or functions, such as a chipset, a chip, a module etc., which can also be part of a network element or attached as a separate element to a network element, or the like. It should be understood that each block and any combination thereof may be implemented by various means or their combinations, such as hardware, software, firmware, one or more processors and/or circuitry.

The network element 30, 50 shown in FIGS. 3 and 5, respectively, may comprise a processing function, control unit or processor 31, 51, such as a CPU or the like, which is suitable for executing instructions given by programs or the like related to the network element control procedure.

In FIG. 3, the processor 31 is configured to execute processing related to the above described setting up of a ProSe D2D communications service. In particular, the processor 31 comprises a sub-portion 310 as a compiling unit configured to compile a message including application control information. The portion 310 may be configured to perform processing according to S21 of FIG. 2. Furthermore, the processor 31 comprises a sub-portion 311 usable as a first transmission unit configured to cause transmission of a scheduling assignment for scheduling the message transmission to a device to be set up. The portion 311 may be configured to perform processing according to S22 of FIG. 2. Furthermore, the processor 31 comprises a sub-portion 312 usable as a second transmission unit configured to cause transmission of the message to the device according to the scheduling assignment. The portion 312 may be configured to perform processing according to S23 of FIG. 2.

Reference signs 32, 52 and 33, 53 denote transceiver or input/output (I/O) units (interfaces) connected to the processor 31, 51. The I/O units 32, 52 may be used for communicating with the network element. The I/O units 33, 53 may be used for communicating with a management application. Reference sign 34, 54 denotes a memory usable, for example, for storing data and programs to be executed by the processor 31, 51 and/or as a working storage of the processor 31, 51.

Figure 4:
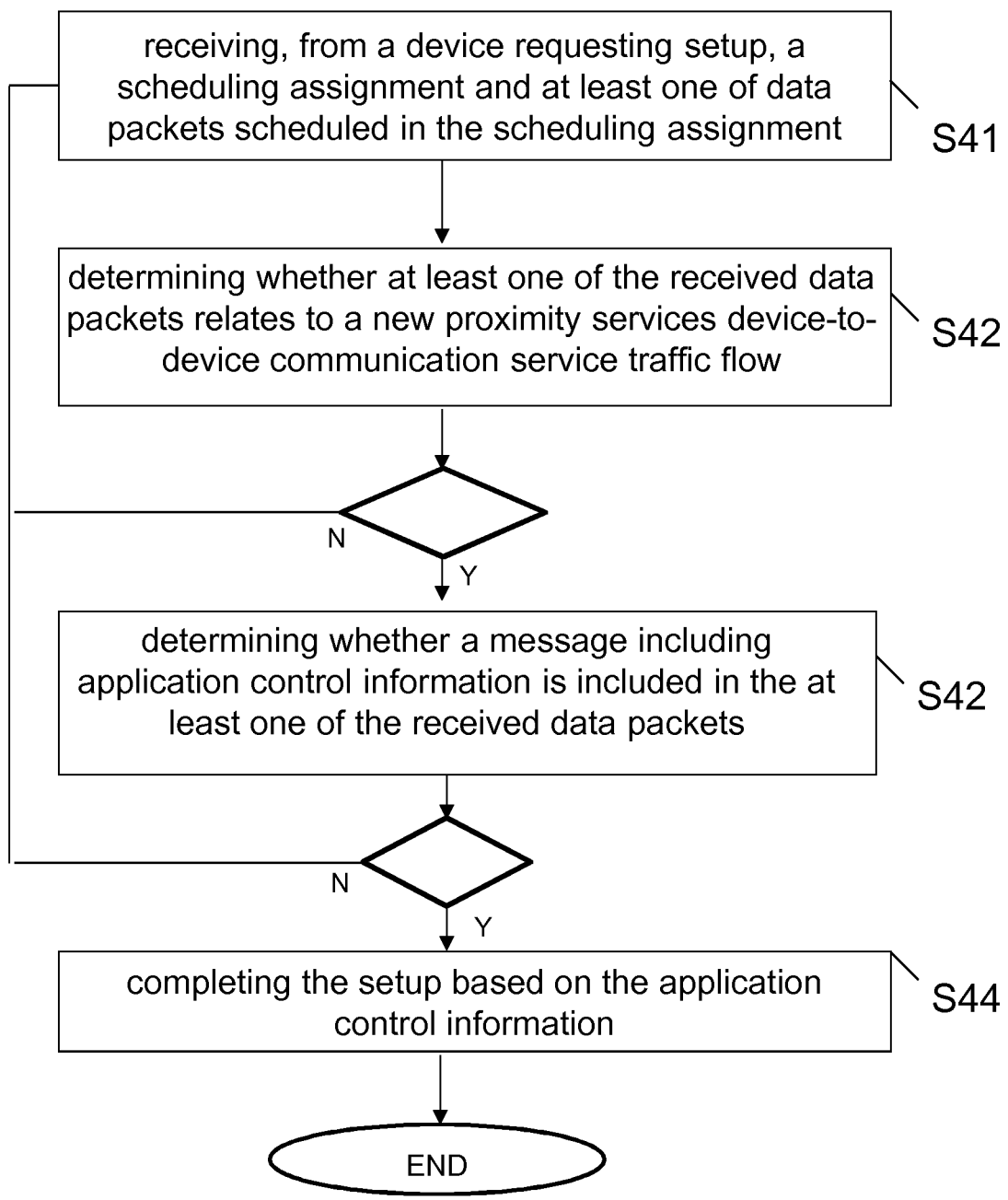
FIG. 4 illustrates a method according to certain embodiments of the invention, which may be carried out by a receiving user equipment.

FIG. 4 shows a method for setting up a ProSe D2D communication service according to some example versions of the disclosure, which may be performed by a user equipment e.g. under LTE-A environment.

In Step S41, a scheduling assignment and at least one of data packets scheduled in the scheduling assignment are received from a device requesting setup.

Then, in Step S42, it is determined whether at least one of the received data packets relates to a new proximity services device-to-device communication service traffic flow.

Further, in Step S43, it is determined whether a message including application control information is included in the at least one of the received data packets.

Still further, in Step S44, the setup is completed based on the application control information.

In FIG. 5, the processor 51 is configured to execute processing related to the above described setting up of a ProSe D2D communications service. In particular, the processor 51 comprises a sub-portion 510 as a reception unit configured to receive a scheduling assignment and at least one of data packets scheduled in the scheduling assignment. The portion 510 may be configured to perform processing according to S41 of FIG. 4. Furthermore, the processor 51 comprises a sub-portion 511 usable as a first determination unit configured to determine whether at least one of the received data packets relates to a new proximity services device-to-device communication service traffic flow. The portion 511 may be configured to perform processing according to S42 of FIG. 4. Furthermore, the processor 51 comprises a sub-portion 512 usable as a second determination unit configured to determine whether a message including application control information is included in the at least one of the received data packets. The portion 512 may be configured to perform processing according to S43 of FIG. 4. Still further, the processor 51 comprises a sub-portion 513 usable as a processing unit configured to complete the setup based on the application control information. The portion 513 may be configured to perform processing according to S44 of FIG. 4.

In line with exemplary versions of the present invention, the AS may be configured so as to assist in transmitting the ACI on layer-2 L2 using one of the below configurations.

According a certain embodiments of the present invention, a first exemplary configuration is based on separation of control information and data information.

This is to have logical control flow(s) for ACI separated from logical data flows from the application layer which is (are) then mapped on one (or more) L2 logical channel(s) per a targeted UE group (many-to-one or one-to-one mapping between application(s) and L2 logical channel carrying ACI per a targeted UE group), designated for transmitting such ACI. For example, the non-access stratum NAS upper layer triggers to set up those L2 logical channels at transmitting Tx and receiving Rx UEs.

This configuration allows for L2 to handle transmission of ACI using logical channel prioritization. ACI may be provided by upper layer (application control) once and stored at L2 and updated (replaced or removed) by the application control layer only when needed. L2 is responsible for transmitting the stored ACI in the configured logical channel identifier(s) LCID(s). Rx UE may determine to receive ACI at L2 based on receiving the designated LCID(s). This alternative, however, is rather close to re-introducing control-plane bearer(s) over D2D link.

According a certain embodiments of the present invention, a second exemplary configuration is based on per packet handling.

In this configuration, upper layer, upon passing a service data unit SDU to access stratum AS, should inform the AS if that SDU is ACI or not, and then AS will be able to treat the SDU in a designated fashion. For examples, ACI SDU may be repeated by certain number of retransmissions for reliability, e.g. using hybrid automatic repeat request HARQ with or without feedback, regardless how actual user data of corresponding application is treated.

To implement this configuration, different protocol data unit PDU types for ACI and actual user data SDU may be introduced at either packet data convergence protocol PDCP or medium access control MAC, but MAC may be a more preferable place due to early packet filtering possibility at Rx UE.

According a certain embodiments of the present invention, a third exemplary configuration is considered as a hybrid option of the above configurations.

PDCP C-PDU or MAC CE or MAC C-PDU is introduced over D2D link to provide ACI which is provided by upper layer above AS (application layer). ACI may be provided by upper layer (application control) and stored at L2 and updated (replaced or removed) by the application control layer only when needed. L2 is responsible for transmitting the stored ACI in PDCP/MAC C-PDU or MAC CE as configured by the upper layer (e.g. once per certain configured interval).

The association of ACI and logical data flow may be provided in L2 in order to allow Rx UE knowing the mapping between received ACI and data flow(s). When L2 transmits ACI either in the logical channel(s) specific to ACI information (e.g. in the first configuration above) or in certain special PDUs (e.g. in the second and third configuration above), L2 needs to attach the LCID of the logical channels that carry the data flow corresponding to the ACI. This may be omitted or implicitly provided in case ACI is sent in the same logical channel as other application data using, e.g., PDCP based second configuration.

According to exemplary versions of the invention, the ProSe receiving UE is configured to determine, upon receiving L2 packets of a new service flow, the first "meaningful" packet carrying ACI of the new service flow to complete the setup of corresponding L2 entities and start receiving the service flow. L2 may discard all the L2 packets of the new service flow prior to receiving the first "meaningful" packet.

In one embodiment of the invention, a 1-bit indication in the SA whether the upcoming transmissions scheduled in the allocation granted in the current SA contain ACI or not. This way allows a newcomer Rx UE upon receiving SA may decide not to receive scheduled data if no ACI information will be provided in the current SA and thus not to waste energy to receive "un-meaningful" data.

It is to be noted that embodiments of the present invention may be implemented as circuitry, in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It should also be understood that the above described example embodiments of the invention are not to be viewed in a limiting sense. Rather, there are several variations and modifications which may be made without departing from the scope of the present invention as defined in the appended claims.

The following meanings for the abbreviations used in this specification apply:
1:M one to many
3GPP 3$^{rd}$ generation partnership project
ACI application control information
AS access stratum
CE control element
D2D device-to-device
HARQ hybrid automatic repeat request
L2 layer 2; data link layer
LCID logical channel identifier
LTE Long Term Evolution
MAC medium access control
NAS non-access stratum
PDCP packet data convergence protocol
PDU protocol data unit
ProSe proximity services
PS public safety
Rx/Tx Receiver/Transmitter
SA scheduling assignment
SDU service data unit
UE user equipment

What is claimed is:

1. A user equipment, comprising:
at least one processor, and at least one memory for storing instructions to be executed by the processor,
wherein the at least one memory and the instructions are configured to, with the at least one processor, cause the apparatus at least to perform receiving, at the user equipment, from another user equipment requesting setup, a scheduling assignment and at least one of data packets scheduled in the scheduling assignment;
wherein the at least one of data packets comprises at least one of a user data packet;
determining, at the user equipment, at least one of the received data packets relates to a new proximity services device-to-device communication service traffic flow;
determining, at the user equipment, a message including application control information is included in the at least one of the received data packets; and completing, at the user equipment, the setup based on the application control information.

2. The user equipment according to claim 1, wherein the at least one of data packets comprises at least one of layer-2 control packet that is scheduled and transmitted with the scheduling assignment.

3. The user equipment according to claim 2, wherein it is determined, upon receiving layer-2 packets of a new service flow, a first packet carrying relevant application control information of the new service flow is received, and discarding all the layer-2 packets of the new service flow prior to receiving the first packet.

4. The user equipment according to claim 2, wherein the message including the application control information is signaled in an access stratum.

5. The user equipment according to claim 2, wherein the application control information comprises information needed at the user equipment to be set up for receiving service contents relating to the proximity services device-to-device communication service.

6. The user equipment according to claim 5, wherein the information comprises information for enabling the application layer to activate an application related to the proximity services device-to-device communication service with the configuration assigned thereto.

7. The user equipment according to claim 2, wherein the application control information comprises at least one of application ID or service ID and related profile setting, or configuration information, or ongoing session ID and related information.

8. The user equipment according to claim 7, wherein the application ID or service ID and related profile setting, or configuration information comprises at least one of source coding scheme, logical data flow, priority, or required bandwidth.

9. The user equipment according to claim 8, wherein the ongoing session ID and related information comprises at least one of starting time, source and destination users or user groups, priority of the source, or service portal information.

10. The user equipment according to claim 1, wherein the message is transmitted and retransmitted once per current scheduling assignment period as allocated, or as configured by an upper layer above an access stratum at a base station.

11. The user equipment according to claim 1, wherein the message is received separated to data information referring to actual user data, and reception of the message is handled using logical channel prioritization.

12. The user equipment according to claim 11, wherein different protocol data unit types for the application control information and the actual user data is provided at either packet data convergence protocol or medium access control.

13. The user equipment according to claim 1, wherein a packet data convergence protocol C-layer protocol data unit or a medium access control element or medium access control C-layer protocol data unit is introduced over device-to-device link to provide the application control information, which is provided by an upper layer above an access stratum and stored at layer-2.

14. The user equipment according to claim 1, wherein the scheduling assignment comprises a 1-bit indication, indicating whether an upcoming transmissions scheduled in allocation granted in the scheduling assignment contain application control information or not.

15. A method, comprising: receiving, at one user equipment, from another user equipment requesting setup, a scheduling assignment and at least one of data packets scheduled in the scheduling assignment;
wherein the at least one of data packets is at least one of a user data packet;
determining, at the user equipment, at least one of the received data packets relates to a new proximity services device-to-device communication service traffic flow;
determining, at the user equipment, a message including application control information is included in the at least one of the received data packets; and completing, at the user equipment, the setup based on the application control information.

16. The method according to claim 15, wherein the at least one of data packets comprises at least one of a layer-2 control packet that is scheduled and transmitted with the scheduling assignment.

17. The method according to claim 15, wherein the message is transmitted and retransmitted once per current scheduling assignment period as allocated, or as configured by an upper layer above an access stratum at a base station.

18. The method according to claim 15, wherein the message is received separated to data information referring to actual user data, and reception of the message is handled using logical channel prioritization.

19. The method according to claim 15, wherein a packet data convergence protocol C-layer protocol data unit or a medium access control element or medium access control C-layer protocol data unit is introduced over device-to-device link to provide the application control information, which is provided by an upper layer above an access stratum and stored at layer-2.

20. A computer program, embodied on a non-transitory computer readable medium, the computer program, when executed by a processor, causes the processor to:
receive, at one user equipment, from another user equipment requesting setup, a scheduling assignment and at least one of data packets scheduled in the scheduling assignment;
wherein the at least one of data packets is at least one of a user data packet;
determine, at the one user equipment, at least one of the received data packets relates to a new proximity services device-to-device communication service traffic flow;
determine, at the one user equipment, a message including application control information is included in the at least one of the received data packets; and complete, at the one user equipment, the setup based on the application control information.

* * * * *